United States Patent Office 3,372,163
Patented Mar. 5, 1968

3,372,163
PROCESS FOR THE PREPARATION OF LINEAR QUINACRIDONE IN THE FORM OF RED PIGMENTS
Marco Tessandori, Milan, Italy, assignor to Aziende Colori Nazionali Affini ACNA S.p.A., Milan, Italy, a corporation of Italy
No Drawing. Continuation-in-part of application Ser. No. 374,276, June 11, 1964. This application May 10, 1966, Ser. No. 548,846
5 Claims. (Cl. 260—279)

This application is a continuation-in-part of copending application Ser. No. 374,276, filed June 11, 1964, now abandoned.

This invention is directed to a process for the preparation of quinacridone in the form of a red pigment and more particularly quinacridone in the gamma form, this gamma form of quinacridone being a red pigment characterized by an X-ray diffraction pattern with bands corresponding to $\theta$ angles of 6.5°, 13.1°, 13.3°, 13.7°, 17.0°, 20.5°, 23.8°, 25.0° and 26.4°. The importance and the desirability of red and red-violet pigments obtained from linear quinacridone characterized by the following Formula 1 are well known.

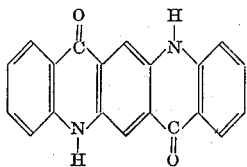

(1)

These compounds can be obtained by a process taught by Lieberman (Justus Liebig's Annalen der Chemie 518, 245–59 (1933)). The product has a high stability against physical and chemical agents, and therefore, is considered a valuable pigment. Moreover, it is known that quinacridone can exist in other crystalline forms which correspond to pigments having different shades and stability towards different solvents and weather conditions. One of the most valuable crystalline forms, however, due to the good red shade and outstanding stability is characterized by a crystalline diffraction pattern under X-ray examination with bands corresponding to $\theta$ angles of 6.5°, 13.1°, 13.3°, 13.7°, 17.0°, 20.5°, 23.8°, 25.0° and 26.4°.

Heretofore, this compound has been prepared by treating crude linear quinacridone with N-methyl-pyrrolidone while hot. It has been found, however, that quinacridone in the form of red pigment can be obtained by treating crude quinacridone with a dialkylsulfoxide and particularly with dimethylsulfoxide, or diethylsulfoxide. The amount of dialkylsulfoxide to be used can generally range within wide limits. In particular, in the case of dimethylsulfoxide the range is from 10 to 100 times that of the crude quinacridone.

As crude quinacridone I employ a quinacridone in the form of an aqueous paste or of a dry powder wherein the crystals present do not have a size greater than 2 microns. Said crude quinacridone is produced by dissolving the quinacridone (prepared according to Liebermann—Ann. der Chemie 518, 245–259 (1935)) in concentrated sulfuric acid and reprecipitating by *slow and gradual dilution with water*. It is very important that this procedure be carefully followed, for the same result may not be obtained, e.g., the quinacridone solution is poured into water. Preferably, the temperature should not be allowed to exceed 25° C. during the slow dilution with water. The thus obtained product is primarily in the alpha crystal phase but may contain up to about 5–10% of the beta crystal phase. The use of crude quinacridone containing amounts of the beta crystal phase higher than about 5–10% (as for instance quinacridones obtained by diluting with water a solution of quinacridone in polyphosphoric acid) gives only a partial transformation into the gamma crystal phase and it is also possible, in the event that the beta form is present in the crude in amounts higher than 20%, that the transformation will not lead to the desired red gamma crystal phase but to a product which consists exclusively of the beta crystal phase.

The treatment of the crude quinacridone in accordance with this invention with a dialkylsulfoxide, such as for instance dimethyl- or diethylsulfoxide, is carried out within a very wide temperature range of from room temperature to the boiling point of the particular dialkylsulfoxide. Likewise, the duration of the treatment may take place over a period of time, but may depend upon several other factors. These factors include the fineness of the starting quinacridone, the specific dialkylsulfoxide and the particular temperature used. By working at 100° C. and by using the alpha-form of quinacridone, the treatment of the quinacridone may take place over a period of 14 hours, for example, when being treated with dimethylsulfoxide.

One embodiment of this invention comprises the treatment of an aqueous crude quinacridone paste. This paste is obtained as hereinbefore described by dissolving quinacridone in sulfuric acid which is then reprecipitated to obtain a solution with water which is filtered and washed until neutral. The quinacridone paste is treated with a dialkylsulfoxide at the boiling temperature. In this manner, it is possible to remove the water from the mixture by distillation while the quinacridone is being transformed into the desired crystal phase. At the end of the treatment, the dialkylsulfoxide, i.e. dimethylsulfoxide, can be removed either by filtration or distillation. The product thus obtained has a particularly valuable red shade and very good stability towards solvents and other chemical and physical agents. This product exhibits the same crystalline X-ray diffraction pattern as the product obtained by treating crude quinacridone with N-methylpyrrolidone.

The preparation of linear quinacridone in the form of red pigment according to the method of this invention affords a remarkable economical advantage in comparison to the methods known heretofore, since the raw materials employed in the method of the present invention such as the dialkylsulfoxides and more particularly dimethylsulfoxide, solvent, are relatively low in cost and easy to obtain. Another advantage of the process of this invention resides in the fact that dimethylsulfoxide is used alone and no further reactants are necessary (such as KOH or alcoholic potassium hydroxide), which further reactants make the recovery and reuse of the solvent more complex and costly.

The pigment obtained according to this invention may be further treated by other methods which include, for example, severe milling so as to reduce the size of the particles and thus increase the dyeing yields. In addition, the products of this invention can be treated by mixing with additives which make the pigments more dispersible.

The following examples are intended to further illustrate the process of this invention without limiting it to the specific embodiments illustrated therein. In the following examples, all parts are by weight unless otherwise indicated.

*Example 1*

1 part by weight of quinacridone (prepared according to Ann. der Chemie 518, 245 (1935) was dissolved in 10 parts of cold concentrated $H_2SO_4$ and then *diluted slowly and grdaually* with 100 parts of water, the temperature not being permitted to exceed 25° C. This aqueous mixture was then filtered, washed and dried. The product, consisting of crystals having a diameter of 2 microns (95% alpha crystal phase +5% beta crystal phase) was mixed with 10 parts by weight of dimethylsulfoxide, heated to 100° C. and agitated at this temperature for about 14 hours. After this period of treatment, the entire mass was filtered and the product obtained was dried. The crystal phase of the product was characterized by a diffraction pattern under X-ray examination having bands at the $\theta$ angles of 6.5°, 13.1°, 13.3°, 13.7°, 17.0°, 20.5°, 23.8°, 25.0° and 26.4°. Products having this X-ray diffraction pattern are considered to have very good application characteristics.

*Example 2*

Approximately 1 part by weight of alpha-quinacridone in the form of an aqueous paste which contained 20% of the crude quinacridone on a dry basis was heated with about 20 parts by weight of dimethylsulfoxide until the water was removed by distillation, while replacing, if necessary, the distillate with additional amounts of dimethylsulfoxide to maintain a fluid mass. After all the water had been distilled off, the mixture was maintained under agitation at 150° C. for about 2 hours and then cooled and filtered. The product obtained has the same crystalline form and characteristics as the product obtained in Example 1.

While this invention has been described with respect to a number of specific embodiments, it is obvious that there are many other modifications and variations which can be made without departing from the spirit and scope of the invention.

What is claimed is:

1. A process for the preparation of quinacridone in the gamma form as a red pigment characterized by a crystalline X-ray diffraction pattern showing bands corresponding to the $\theta$ angles of 6.5°, 13.1°, 13.3°, 13.7°, 17.0°, 20.5°, 23.8°, 25.0° and 26.4° which process comprises treating crude quinacridone having crystals of a size not greater than 2 microns, at least 90% of said crystals being in the alpha form, with about 10 to 100 parts by weight per part of said crude quinacridone of dimethylsulfoxide at a temperature ranging from about room temperature to the boiling point of the dimethylsulfoxide and recovering said gamma form of quinacridone.

2. The process of claim 1 wherein at least 95% of said crystals are in the alpha form.

3. The process of claim 1 wherein the treatment takes place at a temperature ranging from about 100° to 150° C.

4. The process of claim 1 wherein the quinacridone is treated with the dimethylsulfoxide for a period of time ranging from about 1 to 20 hours.

5. The process of claim 3 wherein the quinacridone being treated is alpha-quinacridone in the form of an aqueous paste and wherein water is removed during the transformation of the quinacridone paste into the gamma form of quinacridone.

References Cited

UNITED STATES PATENTS 3,259,514  7/1966  Wilkinson _____ 260—279 X

FOREIGN PATENTS 896,916  5/1962  Great Britain
913,135  12/1962  Great Britain.
948,487  2/1964  Great Britain.
1,235,951  6/1960  France.
1,254,049  1/1961  France.

ALEX MAZEL, *Primary Examiner.*

D. G. DAUS, *Assistant Examiner.*